SECRET COMMUNICATION SYSTEM

Filed Jan. 18, 1956

2 Sheets-Sheet 1

INVENTOR.
DWIGHT D. WILCOX, JR.
BY
Ward, Neal, Haselton, Orme & McElhannon
ATTORNEYS.

April 12, 1960 D. D. WILCOX, JR 2,932,693

SECRET COMMUNICATION SYSTEM

Filed Jan. 18, 1956 2 Sheets-Sheet 2

INVENTOR.
DWIGHT D. WILCOX JR.
BY
Ward, Neal, Haselton, Orme & McElhannon
ATTORNEYS.

United States Patent Office 2,932,693

Patented Apr. 12, 1960

2,932,693

SECRET COMMUNICATION SYSTEM

Dwight D. Wilcox, Jr., Rochester, N.Y., assignor to Salvox Corp., Union City, N.J., a corporation of New Jersey Application January 18, 1956, Serial No. 559,976

5 Claims. (Cl. 179—1.5)

This invention relates to secret communication systems and more particularly to apparatus adapted to be connected into a telephone system and to prevent unauthorized interception of messages transmitted over the system.

It often is desirable to prevent the interception and understanding by unauthorized persons of messages transmitted over a communication system, such as a telephone system. Such unauthorized persons may have devices which may be attached conductively or inductively to the system and may overhear or record the messages.

Secret communication systems of various types are known at the present time. In some systems the transmitted signals are distorted or scrambled and in other systems unmodulated masking or noise signals are superimposed on the transmitted signals. However, with such systems it has been found to be relatively easy for those skilled in the art to intercept and unscramble or decode the transmitted messages or signals. Also, the equipment required in the aforementioned systems has been relatively complicated and expensive to make.

In the system of the present invention modulated masking or noise signals are superimposed on the intelligence or message signals. In the systems previously known, the masking or noise signals have either been of a random nature or have been of substantially a single frequency. Furthermore, the masking signals have been generated by a separate source, that is, independently of the intelligence or message signals, and therefore a skilled interceptor has been able to distinguish between the masking signals and the intelligence signals. On the other hand, in the preferred system of the present invention, the masking signals are generated by a source which is controlled by the intelligence signals it is desired to mask.

In a secret communication system employing masking signals, it is desired that the power output of the masking signal source be as low as possible consistent with the desired degree of secrecy so as to prevent overloading of the telephone line and to prevent undesirable cross-talk between telephone lines. The present invention also relates to a novel masking signal generator which provides a high degree of secrecy with a relatively small amount of power in the masking signal.

A balancing network is employed in the communication system of the present invention for separating the masking signals from the intelligence or message signals. Although conventional balancing circuits, such as a hybrid network, may be employed to separate the masking signals from the intelligence signals, conventional balancing circuits are relatively expensive and difficult to adjust. The values of the components employed in the balancing circuit must be varied from installation to installation, and therefore, it is desirable to eliminate coils or inductors which are employed in conventional balancing circuits. The present invention also relates to a novel balancing circuit which overcomes many of the difficulties encountered with conventional balancing circuits.

It is one object of the invention to provide relatively simple apparatus which may be incorporated in existing communication systems and which provides a relatively high degree of secrecy without overloading of the components of the existing system.

It is a further object of the invention to provide a novel masking signal generator for use with the secret communication system of the invention, which generator provides a high degree of masking with relatively low power output.

It is a further object of the invention to provide a novel balancing network which is particularly adapted for use in the secret communication system of the invention because it is simple to adjust and therefore is adapted for use under the many different conditions encountered in different installations.

Other objects and advantages of the invention will be apparent from the following detailed description of preferred embodiments of the invention, which description should be considered in connection with the accompanying drawings in which.

Figure 1:
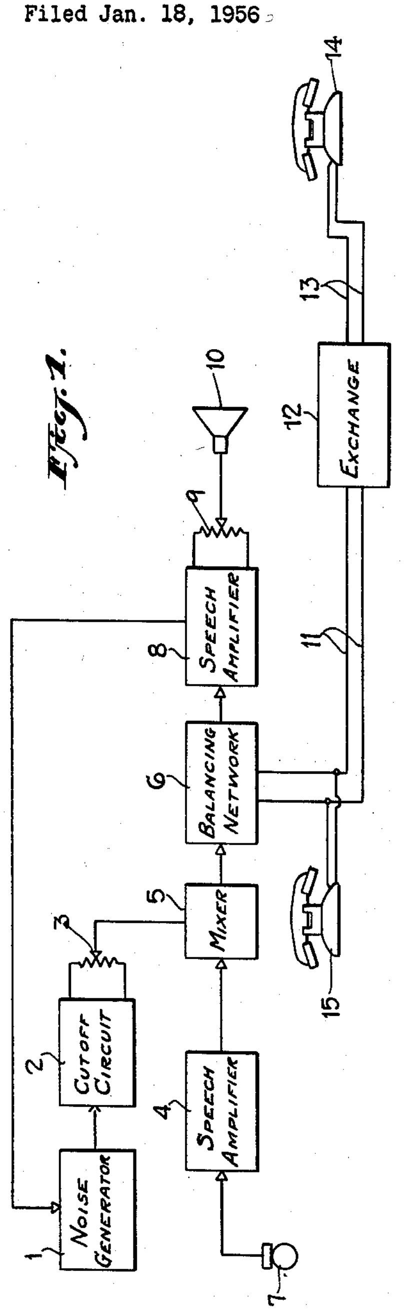
Fig. 1 is a block diagram of a preferred embodiment of the secret communication system of the invention.

The apparatus designated by the reference numerals 1 through 10 in Fig. 1 forms part of the secret communication system of the invention and comprises a masking or noise signal generator 1 whose output is connected to the cutoff circuit 2 and having a modulation control which is connected to a speech amplifier 8. The masking signal generator 1 may, for example, be an oscillator whose frequency may be modulated by the signals received from the speech amplifier 8 and preferably the generator 1 comprises a free-running, astable multivibrator. If desired, the generator 1 may be a monostable multivibrator which is triggered by the speech signals supplied by the amplifier 8. When the apparatus of the invention is employed in connection with the telephone system, the nominal frequency of the generator preferably is in the range between 600 and 1000 cycles per second. The output of the generator 1 may also be modulated in amplitude by the speech signal supplied by the amplifier 8.

The cutoff circuit 2 may be any conventional cutoff circuit and may be a separate circuit as hereinafter described or may be incorporated as part of the generator 1. The cutoff circuit 2 is controlled by the output of a speech amplifier 4 so that when signals appear at the output of the amplifier 4, the circuit 2 prevents transmission of the output signals of the generator 1 to the input of the level control 3, the output of the cutoff circuit 2 being connected to the level control 3.

The input of the amplifier 4 is connected to transducer means 7 for converting audible speech energy into corresponding electrical signals and may, for example, be a microphone. The amplifier 4 amplifies the electrical signals generated by the means 7 and supplies the amplified signals to both the cutoff circuit 2 and to an input of a mixer 5. The input of the mixer 5 is also coupled to the output of the level control 3 and the output of the mixer 5 is coupled to a balancing network 6.

The balancing network 6 is connected to the output of the mixer 5, to the input of the speech amplifier 8 and to a telephone line 11, such as a party line. The balancing network 6 is of a type which permits the signals from the output of the mixer 5 to be transmitted over the line 11 but which prevents transmission of the signals at the output of the mixer 5 to the input of the amplifier 8. The balancing network 6 also permits transmission of signals coming over the line 11 to the input of the amplifier 8. The balancing network 6 may, for example, be a conventional hybrid network employed in telephone systems but, as mentioned above, the balancing network preferably is a network of the type hereinafter described in connection with Fig. 3.

The speech amplifier 8 is a conventional speech signal amplifier whose input is connected to one output of the balancing network 6 and whose output is connected both to the masking or noise signal generator 1 and to the input of a level control 9. The speech signals appearing at the input of the level control 9 are supplied at the desired level to transducer means 10 for converting electrical signals into audible signals and may, for example, be a conventional loudspeaker.

The party line 11 is connected to a conventional telephone exchange 12 which in turn is connected by a party line 13 to a conventional telephone instrument 14.

Assuming that the operator of the telephone instrument is the calling party, a connection between the telephone instrument 14 and the apparatus designated by the reference numerals 1 through 10 is established through the exchange 12 in the usual manner. Thus the calling party lifts the telephone instrument 14 and performs the usual dialing operations which causes ringing of an auxiliary telephone instrument 15 associated with the apparatus 1 through 10 and connected to the line 11. The called party may establish answering conditions either by lifting the receiver of the telephone instrument 15 or by the manipulation of a switch described hereinafter. However, the speech transmission from the called party to the calling party is accomplished by the use of the speech transducer means 7. The called party answers the calling party by speaking into the transducer means 7 which causes the transmission of speech signals in the backward direction and to the calling party over the line 11 through exchange 12 and over line 13. When speech signals appear at the output of the amplifier 4, such signals operate the cutoff circuit 2 and prevent the transmission of masking or noise signals over the line 11. However, when the called party ceases talking, the masking or noise signals are impressed on the line 11.

When the calling party commences talking, speech signals are received by the balancing network 6 over the line 11 and are supplied to the input of the speech amplifier 8. The speech signals at the output of the amplifier 8 operate the transducer means 10 which produces signals audible to the called party. At the same time speech signals are supplied from the amplifier 8 to the generator 1, causing frequency modulation and, if desired, amplitude modulation of the signals supplied by the generator 1. The masking signals pass through the cutoff circuit 2, through the mixer 5 and through the balancing network 6 to the line 11 impressing masking signals on the line 11 which effectively mask the speech signals received from the calling party. It will be noted that in the absence of speech signals from the calling party, masking signals are supplied to the line 11, but unless the auxiliary modulating source hereinafter described is employed, such masking signals are not modulated in frequency or amplitude. However, during the reception of speech signals from the calling party, the masking signals are modulated in frequency and, if desired, in amplitude.

Although in previously known systems masking signals have been applied to the telephone line which interconnects the parties, such signals have not been modulated by the speech signals which it is desired to mask. It has been found that when the masking signals are so modulated it is much more difficult for an unauthorized person to intercept and understand the message being transmitted by the party whose signals are being masked.

As pointed out above, the balancing network 6 is constructed so as to prevent transmission of the masking signals to the transducer means 10 so that even though masking signals are present on the line 11, such masking signals do not interfere with reception at the transducer means 10.

Figure 2:
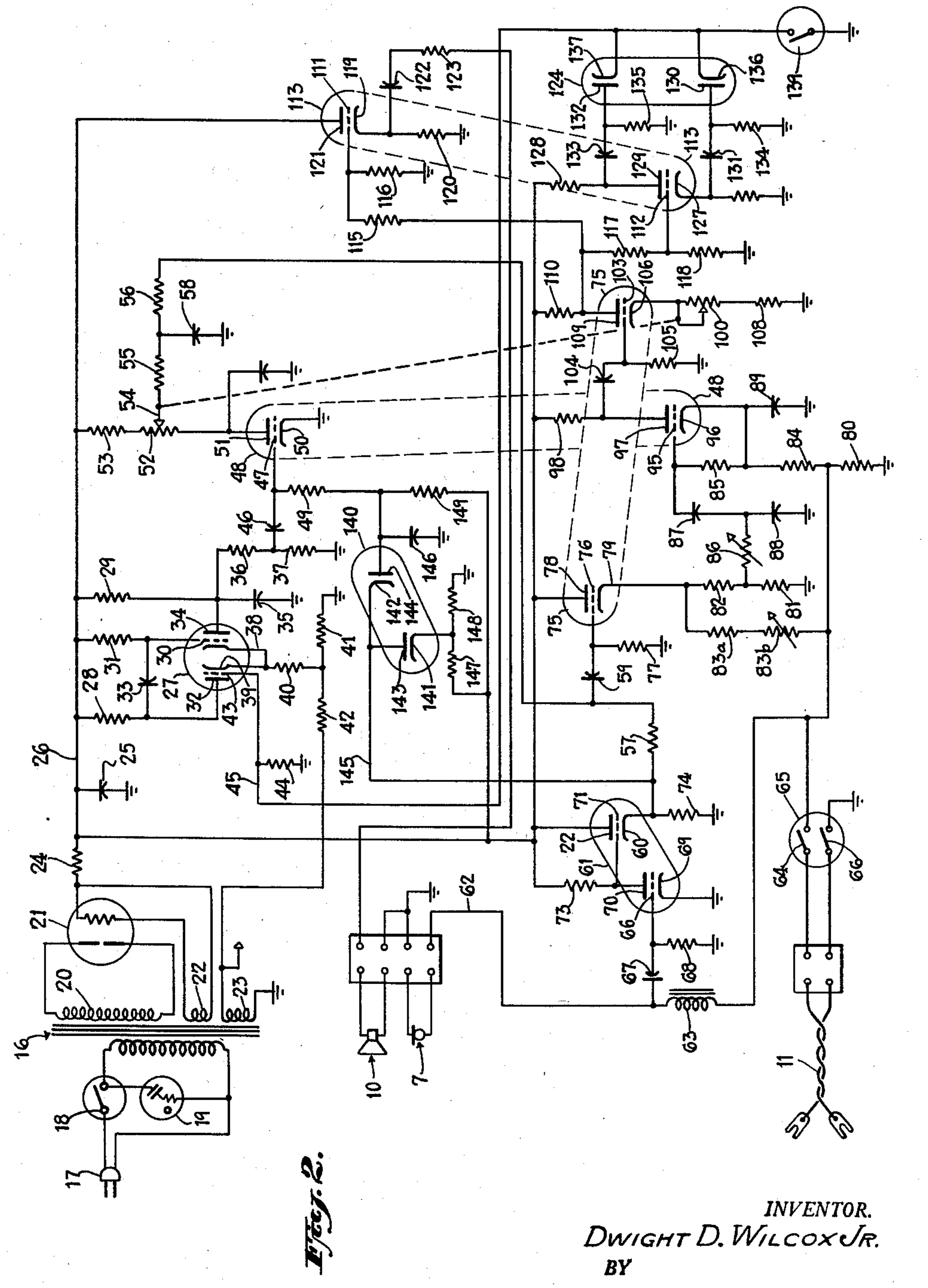
Fig. 2 is a circuit diagram illustrating preferreed circuits which may be employed in the system illustrated in Fig. 1.

Fig. 2 is a circuit diagram of the circuits in the components designated by the reference numerals 1–11 in Fig. 1. The various circuits are energized by a power supply comprising a transformer 16 whose primary winding is connected to an energizing source (not shown) by means of a plug 17. A switch 18 completes the circuit between the primary winding and the energizing source. A pilot light 19, preferably of the gaseous type, is connected across the primary winding. The high voltage secondary winding 20 of the transformer 16 is connected at its mid-point to ground and is connected at its opposite ends to the anodes of a rectifier tube 21. The rectifier tube 21 may, for example, be of a type designated as a 5Y3 and the cathodes thereof are energized from a filament winding 22 of the transformer 16. The filaments of the other tubes in the circuits are energized from a further filament winding 23.

The cathodes of the tube 21 are connected to a filter comprising a resistor 24 and a capacitor 25, a relatively high D.C. voltage being present between the line 26 and ground when the transformer 16 is energized.

The masking or noise signal generator comprises a dual triode vacuum tube 27, such as a type 12AU7, and the necessary circuit components required to form a free-running multivibrator having a nominal frequency in the range of from 600 to 1000 cycles per second. The anodes 32 and 34 of the tube 27 are connected to the lead 26 through load resistors 28 and 29 and one of the grids 30 of the tube 27 is connected to the lead 26 through a resistor 31. The anode 32 of the opposite section of the tube 27 is coupled to the grid 30 through a capacitor 33. The anode 34 is coupled to ground through a capacitor 35 and is coupled to the cutoff circuit through a divider network comprising resistors 36 and 37. The cathodes 38 and 39 are connected to ground through a pair of resistors 40 and 41 and the junction point of the resistors 40 and 41 is connected through a resistor 42 to one end of the filament winding 23 for purposes hereinafter described. The grid 43 is provided with a D.C. path to ground through a resistor 44 coupled to the amplifier of the incoming speech signals by means of a lead 45.

The multivibrator circuit comprising the tube 27 and the above-mentioned components is a conventional astable multivibrator except for the connection to the filament winding 23 and to the incoming speech signal amplifier. The speech signals supplied to the grid 43 over the lead 45 modulate both the frequency of the signal produced by the signal generator and the amplitude of such signals. Accordingly when speech signals are supplied over the lead 45 to the grid 43, the output of the signal generator will be modulated both in frequency and amplitude. As an additional means of obtaining variation in the masking signals, particularly during the time that there are no incoming speech signals, the cathodes 38 and 39 are coupled as above described to the filament winding 23 which supplies a modulating signal at the frequency of the energy of the energizing source to the masking or noise signal generator. This latter modulating signal causes the frequency and amplitude of the output signal of the generator to vary at the frequency of the energy supplied by the energizing source so that the output signal of the generator is simultaneously modulated in both frequency and amplitude by two different signals, namely, the incoming speech signals and the signals supplied by the filament winding 23. Although the connection between the filament winding 23 and the cathodes 38 and 39 of the tube 27 may be omitted, the additional modulation is desired in that it provides a more effective masking signal and therefore it makes the incoming speech signals more difficult to intercept. Also, as hereinafter described, the incoming speech signals are distorted before being used to modulate the signal generator so as to provide a more effective masking signal.

The junction point between the resistors 36 and 37 is coupled by means of a capacitor 46 to the grid 47 of one half of a dual triode 48. The grid 47 is also connected to a biasing circuit hereinafter described through a resistor 49, and the cathode 50 is connected to ground as shown. The anode 51 of the tube 48 is connected to the lead 26 through a potentiometer 52 and a resistor 53, the masking or noise signals, in amplified form, being developed across the potentiometer 52 and the resistor 23. The arm 54 of the potentiometer 52 is connected to a mixing network comprising resistors 55—57 and a capacitor 58. The mixing network is coupled to the balancing circuit by means of a capacitor 59 and is coupled to the output of the called party's speech amplifier through the resistor 57 which, it will be noted, is connected to a cathode 60 of a dual triode vacuum tube 61.

The transducer means or microphone 7 is connected to ground and is connected to the input of a speech amplifier by way of a lead 62. In order to permit answering of a call as hereinafter described, the transducer means 7 preferably is a conductive transducer, e.g. a carbon microphone, and is connected to one lead of the party line 11 through a choke 63 and one arm 64 of a switch 65. The other lead of the line 11 is connected to ground through the other arm 66 of the switch 65. The choke 63 and transducer means provide a D.C. path of low resistance across the leads of the line 11 when the switch 65 is closed and at the same time the choke 63 isolates the line 11 from the transducer means 7 at audio-frequencies. One end of the choke 63 is coupled to the grid 66 of the tube 61 through a capacitor 67 and the grid 66 is connected to ground through a resistor 68. One half of the tube 61 comprising the grid 66, the cathode 69 and the anode 70 form part of a speech signal amplifier which is directly coupled to the other half of the tube 61 comprising the cathode 60, the grid 71 and the anode 72. The anode 70 is connected to the lead 26 through a resistor 73 and the other anode 72 is directly connected to the lead 26. The second or other half of the tube 61 acts as a cathode follower and serves to couple the first half of the tube 61 to the mixing network. A resistor 74 is connected between the cathode 60 and ground and the grid 66 is connected to the anode 70.

From the above it will be seen that the electrical speech signals developed when the called party speaks into the transducer means 7 are amplified by the tube 61 and its associated circuits and are supplied to the mixing network heretofore described. Such amplified speech signals are also transmitted through the mixing network to the input of the balancing circuit comprising one half of a dual triode vacuum tube 75 and one half of the dual triode vacuum tube 48. The grid 76 of the tube 75 is connected to ground through a resistor 77, the anode 78 is directly connected to the lead 26 and the cathode 79 is connected to a circuit which will be described hereinafter in greater detail in connection with Fig. 3.

Figure 3:
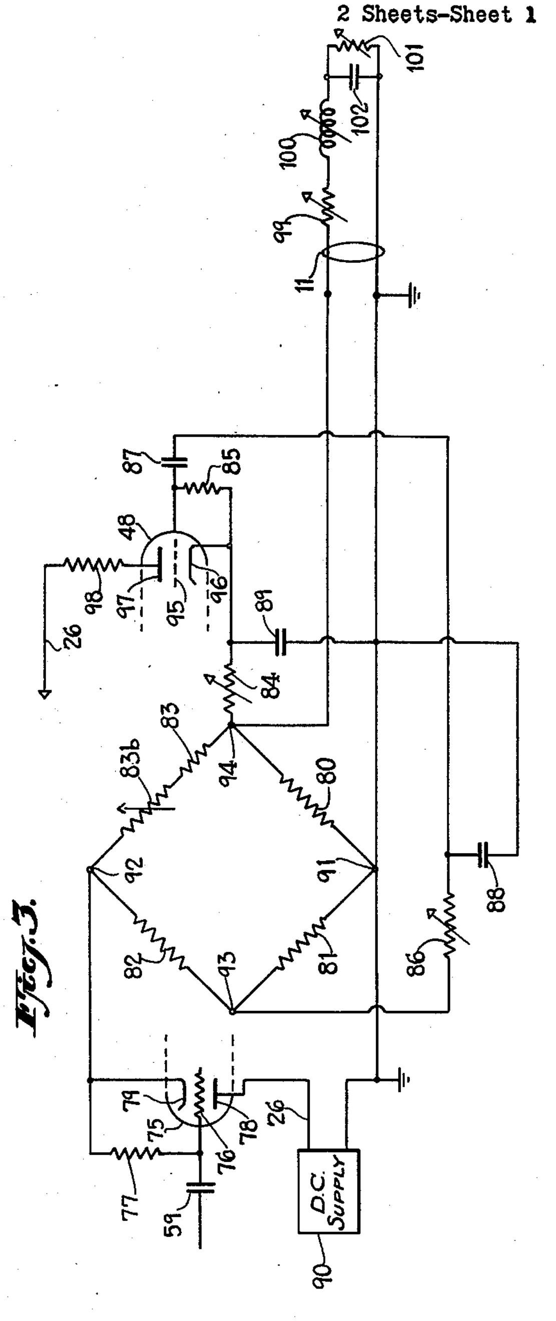
Fig. 3 is a circuit diagram of the balancing network shown in Figs. 1 and 2.

Fig. 3 is a circuit diagram of a balancing network which is particularly adapted for use in the system of the invention because it is simple in form and is easily adjustable to compensate for various line conditions encountered in use. The circuit diagram in Fig. 3 corresponds to a portion of the circuit diagram shown in Fig. 2 but has been redrawn in order to simplify the explanation of the operation of the balancing network. The portion of the vacuum tube 75 comprising the grid 76, the anode 78 and the cathode 79 acts as a low impedance source of speech signals generated by the called party and of the masking or noise signals generated in the generator 1, and is connected in series with the D.C. supply 90 described in detail in connection with Fig. 2 which also has a low impedance for speech signals. The last-mentioned portion of the vacuum tube 75 and the D.C. supply 90 are connected in series to the conjugate points 91 and 92 of a bridge network comprising resistors 80, 81, 82, 83*a* and 83*b*, the arms of the bridge network being designated as R1, R2, R3 and R4. The opposite conjugate points 93 and 94 are connected respectively to a variable resistor 86 and to a variable resistor 84. Conjugate point 94 is also connected to one lead of the line 11. One end of the resistor 86 is coupled to ground through a capacitor 88 and is coupled to the grid 95 of the vacuum tube 48 by means of a capacitor 87. The conjugate point 91 is also connected to ground and one end of the resistor 84 is coupled to ground through the capacitor 89 and is connected to the cathode 96 of the tube 48. The grid 95 is provided with a D.C. connection to the cathode 96 by a resistor 85. The anode 97 is connected to the lead 26 through a resistor 98 and the signals supplied to the grid 95 are amplified and appear across the resistor 98 from which they are transmitted to the speech amplifier 8 described in connection with Fig. 1.

As previously mentioned, it is desired to prevent the noise signals from being supplied to the input of the speech amplifier 8 whereas it is desired to supply the incoming signals from the calling party supplied over the line 11 to the speech amplifier 8. Since the noise signals are supplied to the conjugate points 91 and 92 and since the vacuum tube 48 is connected to the conjugate points 93 and 94, the signals supplied to the conjugate points 91 and 92 will not appear between the conjugate points 93 and 94 when the arms R1—R4 of the bridge network are properly balanced in a well known manner. Furthermore, it will be noted that the voltage of the cathode 96 is equal to the voltage appearing across the capacitor 89 whereas the voltage of the grid 95 is substantially equal to the voltage appearing across the capacitor 88. Also the voltages across the capacitors 88 and 89 are substantially in phase and if the resistors 84 and 86 are properly adjusted the voltages can be made substantially equal. Accordingly, the voltages on the cathode 96 and the grid 95 may be made substantially equal in amplitude and phase and therefore any voltages appearing in these electrodes of the tube 48 will produce no signals across the resistor 98.

Since the incoming signals on line 11 are developed across the resistor 80, the signals in attenuated form will be developed between the grid 95 and the cathode 96 and will therefore appear across the resistor 98. Accordingly, the signals supplied over the line 11 will be supplied to the speech amplifier 8.

Since the line 11 is connected across one arm of the bridge, it will affect the balance of the bridge. The impedance of the line 11 will depend upon the particular installation and therefore usually varies from installation to installation. However, the impedance of the line may be generally represented by a resistor 99, inductance 100, a resistor 101 and a capacitor 102. Due to the effect of the bridge network it has been found that the impedance of the line 11 may be satisfactorily compensated for by the use of the variable resistors 83*b*, 84 and 86 and the capacitors C1 and C3. Adjustment of resistor 83*b* compensates for differences in the values of resistors 99 and 101, adjustment of the resistor 84 compensates for differences in the value of the inductance 100 and adjustment of resistor 86 compensates for differences in the value of the capacitor 102. Accordingly by suitable adjustment of the aforementioned resistors the bridge network can be satisfactorily balanced for the values of the impedance of the line 11 normally encountered. Under normal circumstances it has been found that the values of the resistors in the bridge network, the resistors 84 and 86 and the capacitors 88 and 89 may be as follows:

| | |
|---|---|
| Resistor **81** | 1,000 ohms. |
| Resistor **82** | 10,000 ohms. |
| Resistors **83***a* and **83***b* | 10,000 ohms (variable). |
| Resistor **80** | 680 ohms. |
| Resistor **84** | 1,000 ohms (variable). |
| Resistor **86** | 100,000 ohms (variable). |
| Capacitor **88** | 0.002 microfarad. |
| Capacitor **89** | 0.1 microfarad. |

In the same cases where extremely good balance is not required, a fixed resistor having resistance of 330 ohms may be substituted for the variable resistor 84.

Referring now to Fig. 2, it will be seen that one end of the resistor 98 is coupled to the grid 103 of the second half of the tube 75 by means of a capacitor 104. The grid 103 is connected to ground through a resistor 105 and the cathode 106 is connected to ground through a variable resistor 107 and a fixed resistor 108. The section of the tube 75 comprising the grid 103, the cathode 106 and the anode 109 forms part of the speech amplifier 8 and the gain thereof may be varied by adjusting the resistor 107 which corresponds to the regulator 9 shown in Fig. 1.

The anode 109 is connected to the lead 26 through a resistor 110 and one end of the resistor 110 is coupled to grids 111 and 112 of the dual triode vacuum tube 113. The grid 111 is connected to the junction point of a pair of resistors 115 and 116 forming a voltage divider network and the grid 112 is similarly connected to a voltage divider network comprising a pair of resistors 117 and 118. The cathode 119 is connected to ground through a resistor 120 and the anode 121 is directly connected to the lead 26. The section of the tube 113 comprising the grid 111, the cathode 119 and the anode 121 acts, with its associated components, as a cathode follower. The incoming speech signals supplied by line 11 thus appear across the resistor 120 and are transmitted to the transducer means 10 by means of a capacitor 122 and a resistor 123.

As mentioned above, the incoming speech signals preferably are distorted before being employed to modulate the masking or noise signal generator. The lower section of the tube 113 as well as the dual diode 124 form part of the masking or noise signal generator and distort the incoming speech signals. The lower section of the tube 113 is connected as a phase splitter and develops across the resistor 126 connected between the cathode 127 and ground and across the resistor 128 connected between the anode 129 and the lead 26 incoming speech signals of substantially equal amplitude and opposite phase. The cathode 127 is coupled to the anode 130 by a capacitor 131 and the anode 132 is coupled to the anode 129 by a capacitor 133. The anodes 130 and 132 are respectively connected to ground through resistors 134 and 135. The cathodes 136 and 137 are connected together and are connected by the lead 45 to the grid 43 of the tube 27 of the masking or noise signal generator. Accordingly there is developed across the resistor 44 and applied to the grid 43 incoming speech signals which are highly distorted and such distorted speech signals modulate the masking or noise signal generator in both frequency and amplitude.

A switch 139 which is normally open is provided to permit adjustment of the signal generator. The switch 139 is closed during such adjustment so as to prevent modulation of the signal generator during the adjustment thereof.

Although in the preferred form of the invention the masking or noise signal generator is modulated by the incoming speech signals because it provides modulation only during the presence of incoming speech signals and because the modulation varies with the incoming speech signals, it is possible to modulate the signal generator by other known types of audio-frqeuency sources which supply audio signals whose frequency and amplitude vary with time. For example, other well known sources of speech signals may be connected to the grid 43 in place of the connection between the line 11 and the lead 45. However, a source of audio signals of a single frequency is not considered satisfactory because it does not provide a masking signal which is nearly as effective as the masking signal produced as above described.

The cutoff circuit for preventing transmission of the masking or noise signals during the transmission of speech signals by the called party comprises a dual diode tube 140 having cathodes 141 and 142 and anodes 143 and 144. The tube 140 is connected as a full wave rectifier and rectifies the speech signals appearing across the resistor 74 to which the cathode 142 and the anode 143 are connected by a lead 145, providing across a capacitor 146 a bias which is sufficient to prevent transmission of the noise or masking signals through the amplifier tube 48. The cathode 141 is connected to a voltage divider network comprising a pair of resistors 147 and 148 and the anode 144 is connected to the grid 47 through the resistor 49 and is connected to one end of the last-mentioned voltage divider network by a resistor 149. Accordingly when speech signals appear across the resistor 74 due to the generation of speech signals by the transducer means 7, which is activated by the called party, the tube 48 is biased so that no noise or masking signals are supplied to the line 11. For this reason, no noise or masking signals are present on the line 11 when the called party is talking to the calling party.

Having thus described my invention with particular reference to the preferred form thereof and having shown and described certain modifications, it will be obvious to those skilled in the art to which the invention pertains, after understanding my invention, that various changes and other modifications may be made therein without departing from the spirit and scope of my invention, as defined by the claims appended thereto.

What is claimed as new and desired to be secured by Letters Patent is:

1. In a telephone system, a telephone transmission channel, means to impress first speech signals upon said channel for transmission thereover to a distant receiving point, a source of masking signals having a similar frequency band to that used by said speech signals, said source having means for modulating a characteristic of said masking signals, a receiver for said speech signals at said receiving point, means at said receiving point for generating second speech signals, a cutoff circuit coupled to and controlled by said last-mentioned means and coupled to said source of masking signals for preventing transmission of said masking signals during generation of said last-mentioned speech signals, a balancing circuit having conjugate pairs of branches, means to connect said channel, said source of masking currents, said modulating means and said receiver to different branches of said balancing circuit in such manner as to allow said first speech signals to flow into said receiver while preventing said masking signals from reaching said receiver, to impress said masking signals on said channel in such strength as to provide effective masking of said first speech signals and to allow said first speech signals to modulate said masking signals.

2. In a secret communication system, a first source of speech signals, a second source of speech signals, a source of masking signals including means for modulating the frequency of said masking signals, transducer means for converting speech signals into sounds, a balancing circuit comprising a bridge network having two adjacent resistance arms and two further arms each formed by a resistor connected in parallel with a resistor connected in series with a capacitor, means connecting said first source and said source of masking signals to the junction point of said adjacent arms and the junction point of said further arms, means connecting said transducer means to each of the junction points of said resistor and said capacitor in said further arms and means connecting said second source to one of said further arms.

3. In a secret communication system, a source of speech signals, a source of masking signals, transducer means for converting speech signals into sounds, a balancing circuit comprising a bridge network having two adjacent resistance arms and two further arms each formed by a resistor connected in parallel with a resistor connected in series with a capacitor, means connecting said source of masking signals to the junction point of said adjacent arms and the junction point of said further arms, means connecting said transducer means to each of the junction points of said resistor and said capacitor in said further arms and means connecting said source of speech signals to one of said further arms.

4. In a secret communication system, a transmission line, a source of masking signals, a balancing circuit comprising a bridge network having two adjacent resistance arms and two further arms each formed by a resistor connected in parallel with a resistor connected in series with a capacitor, means connecting said source of masking signals to the junction point of said adjacent arms and the junction point of said further arms, and means connecting said line to one of said further arms.

5. In a secret telephone transmission system, a transmitting and a receiving station, telephone transmission channel means exending between said stations, a source of message signals and a source of masking signals of a magnitude exceeding that of said message signals, said last-mentioned source including cutoff means for preventing transmission of said masking signals, means to impress said message signals on said channel means for transmission thereover to said receiving station, a source of message signals at said receiving station, said cutoff means being coupled to said last-mentioned source and being controlled thereby for preventing transmission of said masking signals by said last-mentioned message signals, receiving means at said receiving station for said message signals, and a balancing network coupling said receiver and said source of masking signals to said channel means and in conjugate relation to each other.

References Cited in the file of this patent

UNITED STATES PATENTS

| | | |
|---|---|---|
| 1,571,010 | Kendall | Jan. 26, 1926 |
| 1,606,763 | Hartley | Nov. 16, 1926 |
| 2,107,756 | Kendall et al. | Feb. 8, 1938 |
| 2,279,659 | Crosby | Apr. 14, 1942 |
| 2,559,778 | Marks et al. | July 10, 1951 |